April 26, 1938. J. KAUPERT 2,115,555
TURN SIGNALING DEVICE FOR AUTOMOBILES
Filed April 30, 1936
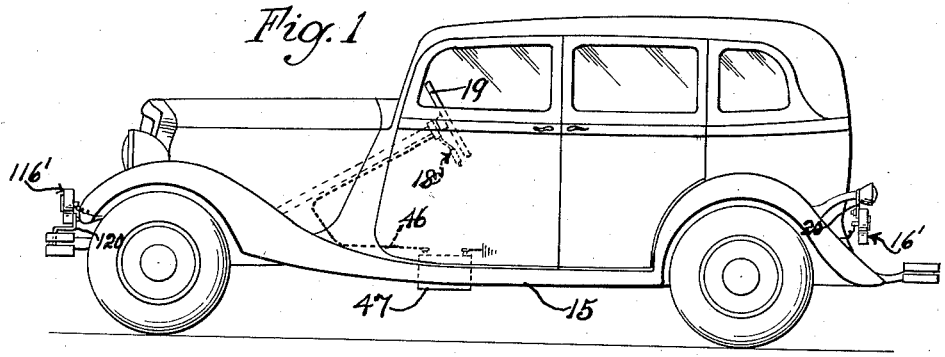
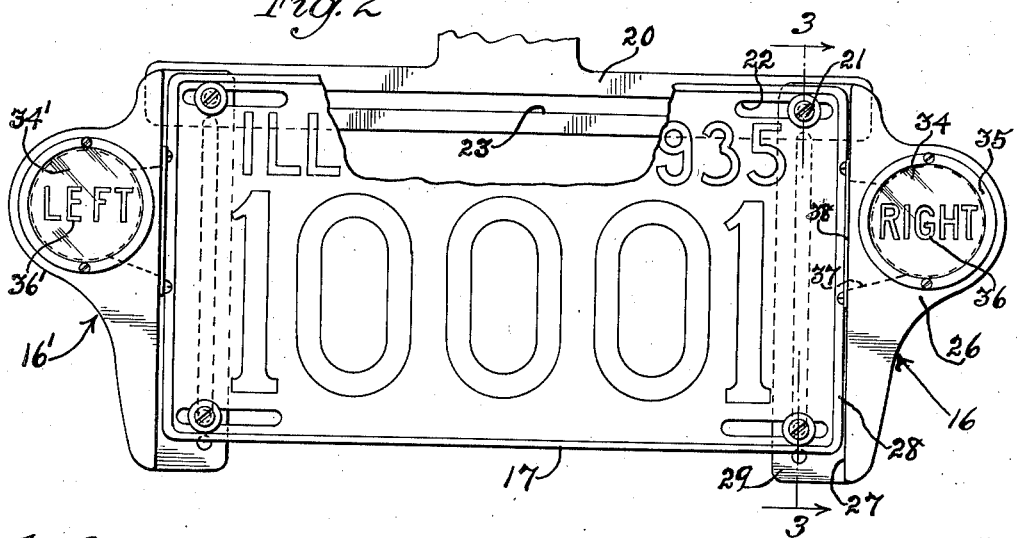
Inventor
Joseph Kaupert
by J Daniel Stuwe
Attorney Patented Apr. 26, 1938

2,115,555

UNITED STATES PATENT OFFICE 2,115,555

TURN SIGNALING DEVICE FOR AUTOMOBILES

Joseph Kaupert, Chicago, Ill.

Application April 30, 1936, Serial No. 77,193

2 Claims. (Cl. 177—329)

This invention relates to a new and improved turn signaling device for automobiles.

One of the main objects of this invention is to provide a signal device, for indicating a right-hand and a left-hand turn of an automobile or similar motor vehicle, which device is quite simple and economical in construction, so that it can be manufactured at a small cost and can be marketed at a very reasonable price.

Another object of this invention is to provide such a signal light which is readily mountable on the automobile, by attaching it onto the end of the license plate, and utilizing the usual license plate bracket and the usual fastening screws of said plate for also mounting the signal light in position.

These and various other objects and advantages are attained with this invention, as will become apparent from the following description, taken in connection with the accompanying drawing wherein the invention is shown in its preferred form; it being understood that various other arrangements and forms of construction may be adopted in carrying out the objects and purposes of this invention.

In the drawing:

Fig. 1 is a side elevation of an automobile having my invention applied thereto.

Fig. 2 is an elevational view of the rear license plate with a pair of my signal lamps mounted in position on the two ends thereof.

Fig. 3 is a vertical cross-sectional view thereof, taken on line 3—3 of Fig. 2.

Fig. 4 is a vertical sectional view thereof, taken on line 4—4 of Fig. 3.

Fig. 5 is a horizontal sectional view thru the signal lamp.

In the drawing I have disclosed my invention in its preferred form of construction, applied to an automobile 15. The invention briefly comprises means 16 conveniently mountable on the license plate 17 of the automobile, for signaling a turn or indicating a change in the direction, that is intended to be made with the automobile; and also comprises operating means 18, for said signaling means, which is preferably in the form of a control switch, adapted to be mounted so that it can be conveniently operated by a finger of the hand which engages and operates the steering wheel 19. The combined device is constructed very simply and inexpensively, so that any one will be enabled to buy and install the same.

The turn signaling means comprises a pair of similarly constructed companion members 16 and 16', one arranged to be applied to the right-hand side of the license plate 17 and the other to the left-hand side thereof, as shown in Fig. 2. This license plate shown in Fig. 2 is the one which is mounting at the rear of the automobile 15, by the use of bracket means 20 and securing elements or screws 21 which extend thru slots 22 in said plate and thru slots 23 in the bracket means, in the usual manner. A similar pair of turn indicating or signaling means 116 and 116' is mounted on the companion license plate which is secured by bracket means 120 on the front end of the automobile.

The turn indicating means 16 comprises a casing 26 which has at its side adjoining the license plate a vertically extending shoulder 27 adapted to bear against the end 28 of said plate, and has a flange 29 extending laterally from the front part of said shoulder, adapted to be placed between said plate 17 and its supporting bracket 20. Said flange 29 is provided with holes 30 near its upper and lower ends, and with a vertical slot 31 extending thru the main part therebetween, so that the screws 21, which are used to secure the license plate 17 to the bracket 20, can be readily extended thru either the holes 30 or thru the slot 31, or thru both, according to the height of the license plate, for securing the casing in position.

The casing 26 contains a chamber 33, which is open at the rear face end, opposite flange 29, being covered by a transparent panel or pane 34 which is removably secured in place by a frame 35 and suitable screws therein. Said window pane 34 has turn indicating means 36 provided thereon, preferably by placing the word "Right" on the right-hand member 16 to indicate an intended right-hand turn, and an indicating means 36' provided on the pane 34' mounted on the left-hand member 16', preferably by placing the word "Left" on said pane, to indicate an intended left-hand turn. A channel or opening 37 extends from chamber 33 to the inward side of shoulder 27 on casing 26, adjoining the license plate, and a window pane 38 is secured thereover, with screws or the like.

For clearly displaying the turn signal means 36, a lamp 39 is mounted in chamber 33 for illuminating said signal means; and this lamp is preferably in the form of an electric light bulb which is detachably mounted in a socket 40 provided in chamber 33. Said socket is grounded thru the casing on the automobile frame, and it has a circuit wire 42 extending forwardly therefrom, which is connected with a corresponding circuit wire 142 extending from the similar right-hand turn indicating means at the front end grounded at 41', and a circuit wire 42' extending therefrom is connected to the lamp in the front signal device 116', the front sockets with their lamps being also grounded on the automobile frame.

While I have disclosed herein a certain preferred embodiment of my invention, this is to be taken as illustrative only, as it is capable of change and variation to meet differing conditions and requirements, and I contemplate such modifications as come within the spirit and scope of the appended claims.

I claim:

1. A turn signaling casing adapted for use on an automobile provided with a bracket having a flat attaching portion and a license plate mounted on said portion by the use of bolt means, said casing consisting of a unitary structure including a lamp chamber having a cylindrical interior and bracket means on one side thereof provided with shoulder means arranged in a straight line to fit against one side of said license plate, integral flange means extending laterally from said shoulder means and bearing against the marginal portion at the side of the license plate, to be partly clasped between said plate portion and said attaching portion of the bracket, there being openings in said flange means including an elongated slot adapted to adjustably receive said bolt means, to secure the casing in position at the side of the plate, thereby fitting any size or length of plate, said chamber having a pair of openings extending from said cylindrical interior, one outwardly from the automobile and the other laterally thru said shoulder means toward the face of the license plate.

2. An article of manufacture consisting of a unitary structure comprising a casing having a lamp chamber therein and bracket means on one side thereof provided with shoulder means arranged in a substantially straight line, and flange means extending sidewise from said shoulder means, there being a window opening extending sidewise from said chamber thru said shoulder means and another window opening extending rearwardly from said chamber, also openings provided in said flange means for receiving fastening elements whereby to mount the casing in position.

JOSEPH KAUPERT.